United States Patent
Kordonski et al.

(10) Patent No.: US 9,157,010 B2
(45) Date of Patent: Oct. 13, 2015

(54) MAGNETORHEOLOGICAL FLUID FOR ULTRASMOOTH POLISHING

(75) Inventors: William Kordonski, Webster, NY (US);
Sergei Gorodkin, Webster, NY (US);
Eric Oswald, Rochester, NY (US)

(73) Assignee: Cabot Microelectronics Corporation, Aurora, IL (US)

(*) Notice: Subject to any disclaimer, the term of this patent is extended or adjusted under 35 U.S.C. 154(b) by 522 days.

(21) Appl. No.: 13/551,786

(22) Filed: Jul. 18, 2012

(65) Prior Publication Data

US 2014/0020305 A1 Jan. 23, 2014

(51) Int. Cl.

| | |
|---|---|
| *B24D 3/00* | (2006.01) |
| *B24D 11/00* | (2006.01) |
| *B24D 18/00* | (2006.01) |
| *C09K 3/14* | (2006.01) |
| *C09C 1/68* | (2006.01) |
| *C09G 1/02* | (2006.01) |

(52) U.S. Cl.
CPC ......................................... *C09G 1/02* (2013.01)

(58) Field of Classification Search
USPC ............................................ 51/309, 293, 307
See application file for complete search history.

(56) References Cited

U.S. PATENT DOCUMENTS

| | | | | |
|---|---|---|---|---|
| 5,804,095 | A * | 9/1998 | Jacobs et al. | 252/62.52 |
| 6,402,978 | B1 * | 6/2002 | Levin | 252/62.52 |
| 2005/0019114 | A1 * | 1/2005 | Sung | 407/119 |

* cited by examiner

*Primary Examiner* — James McDonough
(74) *Attorney, Agent, or Firm* — Thomas Omholt; Arlene Hornilla

(57) ABSTRACT

A magnetorheological fluid for use in magnetorheological ultrasmooth polishing of a substrate surface, comprising an aqueous carrier vehicle; a first amount of magnetic particles having a average diameter between about 1 micrometer and about 2 micrometers; and a second amount of abrasive particles having an average diameter between about <1 nanometer and about 15 nanometers. The fluid may further comprise a chemical stabilizer. Preferably the size of the magnetic particles is 2 to 3 orders of magnitude greater than the size of the abrasive particles. Preferably, the magnetic particles are spherical and include carbonyl iron, and preferably, the abrasive particles are selected from the group consisting of aluminum oxide, zirconium oxide, cerium oxide, silica, boron carbide, silicon carbide, natural diamond, synthetic diamond, and combinations thereof.

6 Claims, No Drawings

MAGNETORHEOLOGICAL FLUID FOR ULTRASMOOTH POLISHING

TECHNICAL FIELD

The present invention relates to methods and apparatus for finishing of surfaces; more particularly, to fluids for use in magnetorheological finishing (MRF) of surfaces (also referred to herein as "polishing"); and most particularly, to an improved magnetorheological fluid composition and method which can provide atomically smooth surfaces in magnetorheological polishing of substrate surfaces.

BACKGROUND OF THE INVENTION

The technologies of ultrasmooth surfaces with rms roughness <0.15 nm are becoming increasingly important for the fields of conventional optics, semiconductor technology, UV, and x-ray optics. Increasingly, a finer finish polish is being sought in a variety of technologically-advanced glass polishing applications such as the production of photomask blanks, the manufacture of precision lenses and prisms, improvements in surface planarity, and the reduction of incidents of defectivity which are critical to achieving higher levels of device performance.

Some known prior art polishing techniques, for example based on pitch or synthetic pad/lap polishers, can deliver such precision ultrasmooth surfaces, assuming availability of a highly skilled optician. But such conventional methods have low yields due to their unpredictability, requiring much iteration to achieve desired figure and surface quality. Hence, these methods tend to be quite expensive of time and materials and are not well suited to volume production of such surfaces.

In general, polishing is accomplished by various mechanisms that remove or add material in a way that minimizes high-frequency spatial irregularities with respect to the mean surface. Various forms of abrasion are traditional methods for producing ultrasmooth surfaces. The nearly pure abrasion process of optical polishing is that of spherical particles elastically indenting or penetrating a surface and gauging a swath through the material with a cross-section proportional to the cross-section of the penetration. In all cases, the abrasion is somehow regulated by a reference surface, traditionally called a "lap". There may be no contact, soft contact, or hard contact with the lap. The smoothness obtained is a function of the lap and of the size of the abrasive particles; their physical and chemical relationship to the surface being polished; the physical and chemical properties of the liquid vehicle containing the abrasive; and the conditions of polishing such as pressure, speed, and temperature.

Methods in the prior art in which there appears to be no direct coupling of the workpiece and the lap include a float-polishing method and an elastic emission method.

In the float-polishing process, implemented on plane surfaces for diameters up to about 10 cm, the part rests on a corrugated tin lap. Hydrodynamic forces lift the part above the lap, so there is no contact with the hard lap material. Eddies activated by the corrugations swirl ultrafine particles (usually silica colloids of 4-7 nm diameter) against the surface, gently abrading it. Elastic emission polishing employs a rapidly rotating ball of plastic to generate the turbulence.

In each case, there appears to be no direct coupling (i.e. part-abrasive-lap) of the workpiece and the lap. The particulates impinge on the surface but are cushioned by the liquid vehicle. The process appears to be strongly dependent on the part-to-lap gap. Thus the figure or shape is controlled by the nearby lap surface. These processes were developed especially for the low subsurface damage requirements of the semiconductor industry and appear to be extraordinarily successful in this respect. Figure and smoothness are also excellent. Smoothness (also referred to herein as "roughness") as low as 0.2 nm rms (2~400 cycles/mm, band limited) was achieved. In some instances, roughness as low 0.135 nm rms in the same frequency range has been reliably reported.

Soft laps include foams and felts, in which there is considerable elastic resiliency. As expected, smoother surfaces are obtained with combinations of fine particulates and softer laps. Various laps of this type are used with fine suspensions, such as colloidal silica, in the semiconductor industry. However, a resilient lap tends to follow longer spatial frequency perturbations. Thus, depending on the properties of the lap and to some degree on the polishing conditions, there is a tendency to set up a two-dimensional spatial resonance known as "orange peel."

For the most critical optical surfaces, a hard lap made of pitch is used. Pitch is a viscoelastic fluid material that gradually conforms to a regular surface and permits abrasive particles to sink in to a nearly uniform depth. This fluid's behavior is almost purely Newtonian, and its viscosity can be carefully controlled by mixing and temperature control. It is usually used at viscosities in the 2 to $8\times10^8$ poise range for metals and in the 2 to $8\times10^9$ poise range for glasses. With these high viscosities, the material appears quite rigid locally but yields slowly in a self-correcting manner with the surface. For aspheric surfaces, it is backed by a resilient pad of some sort.

It is known in the art that roughness is dependent on particle size and concentration in the polishing slurry. Thus, to achieve maximum smoothness small particles must be used with a fairly small size distribution and a fairly high particulate concentration. The maximum smoothness for a given distribution occurs just as the particles are about to disappear beneath the surface of the pitch. At this point, they have been pressed down to a nearly constant height, and the maximum number of particles is engaged to yield the lowest load per particle. This load is not completely uniform since the largest particles encounter a larger resistance to penetration into the pitch, causing a greater penetration into the material that supplies the load. With these techniques, surfaces near 0.1 nm rms have been produced, with a few readings of 0.08 nm rms in the 5-400 cycles/mm spatial frequency range.

It follows from the above description that both contact and non-contact conventional polishing methods can provide ultrasmooth surfaces under appropriate conditions, among which abrasive particle size is the principal factor defining the size of the contact zone as well as particle load.

In non-contact polishing, a particle's load results from particle-surface impingement and is proportional to the particle mass or the third power its diameter, while in contact polishing each particle supports a load in proportion to the square of its diameter. Reduction in particle size leads to dramatic reduction of particle load, in turn resulting in reduction of penetration depth and roughness. At the same time, however, excessive reduction in particle load eventually leads to diminishing of ultimate surface tensile strength that provides tensile failure in the manner of ductile failure or in the manner of brittle failure, in other words in fading away of material removal.

Thus, reduction in particle size in order to lower surface roughness has a lower limit that depends on particle and surface properties. Below about 50-100 nm, one cannot achieve smoother and smoother surfaces simply by using finer and finer abrasives because the unit load becomes unacceptably low and substrate removal simply doesn't occur. Such fine particles are referred to in the art as "nanoparticles".

In general, particles downsizing processes have broken through a certain barrier beyond which the old laws no longer necessarily apply. Any material reduced to the size of nanoparticles can suddenly behave much differently than it did before.

What makes a nanoparticle so unique? Particles in the nanometer range have two particular properties.

First, anything smaller than about 50 nm is no longer subject exclusively to the laws of classical physics, but of quantum physics. This means that nanoparticles can assume other optical, magnetic, or electrical properties that distinguish them clearly from their larger relatives in the particle family.

Second, as particle size decreases, the ratio between particle mass and surface area changes. This is because the smaller a body becomes, the greater its surface area becomes in relation to its mass. The increase in the surface-area-to-volume ratio, which is a gradual progression as the particle gets smaller, leads to an increasing dominance of the behavior of atoms on the surface of a particle over of those in the interior of the particle. The exceptionally large relative surface area and increased surface/volume ratio enables nanoparticles to exert a stronger effect on their environment and to react with other substances. In particular, nanoparticles with a crystalline structure have more atoms on their surface that are less strongly bonded than those in the interior of the particle. Given their unstable situation, the atoms are reactive. The smaller the particle, the greater is the relative surface area. This also means that there are proportionately more atoms on the surface and fewer in the interior. In short, the smaller the particle, the more reactive is the substance.

Some of the properties of nanoparticles might not be predicted simply by understanding the increasing influence of surface atoms or quantum effects. For example, it was recently shown that perfectly-formed silicon "nanospheres" with diameters of between 40 and 100 nanometers, were not just harder than silicon but among the hardest materials known, falling between sapphire and diamond.

MRF is a deterministic high performance polishing method that can deliver high precision surfaces in a programmable automatic regime. While a substrate surface roughness of ~0.3-0.4 nm rms can be achieved by prior art MRF technology on glass, it is relatively low but acceptable for a many applications. A still lower level of roughness is yet to be achieved in MRF. Providing such a lower level of roughness by MRF is the object of the present invention.

In MRF, an abrasive particle's load is provided by a fluid flow, in particular by the shear flow of a concentrated mixture of solid particles. The key element in MRF is the MR polishing fluid itself.

MR fluid is a liquid composition that undergoes a change in mechanical properties and converts into a plastic material in the presence of a magnetic field. Normally, MR fluids comprise ferromagnetic (susceptible to soft magnetization) particles, typically greater than 0.1 micrometers in diameter, dispersed within a carrier fluid, typically water. In the presence of a magnetic field, the particles become magnetized and organized into chains within the fluid. The chains of particles form a spatial structure that is responsible for a remarkable change in mechanical properties, particularly for the increase of the yield stress, exhibited as an increase in apparent viscosity of many orders of magnitude. In the absence of a magnetic field, the particles return to a disorganized or free state and the initial condition of the overall material is correspondingly restored.

In general, an MR polishing fluid comprises four main constituents: water, magnetic particles, abrasive, and chemical additives. Due to unique chemical properties, water is preferred both as a chemical agent and a carrier fluid for polishing slurries intended for polishing glasses or silicon substrates.

It is commonly accepted to model MR fluid as a Bingham plastic material with the yield stress controlled by a magnetic field. The model suggests that material under deformation behaves as a solid body when stress is below the yield point and flows like a Newtonian fluid when the stress is higher than the yield point.

In MRF, a convex surface, such as a lens to be polished, is installed at some fixed distance from a moving wall (typically the outer surface of a moving wheel), so that the lens surface and the wall form a converging gap. An electromagnet, placed below the moving wall, generates a non-uniform magnetic field in the vicinity of the gap. The magnetic field gradient is normal to the wall. The MR polishing fluid is delivered to the moving wall just above the electromagnet pole pieces to form a polishing ribbon. As the ribbon moves into the field, the MR fluid stiffens and acquires plastic Bingham properties and becomes highly stratified. The upper layer of the ribbon adjacent the lens surface becomes saturated with abrasive due to levitation of non-magnetic abrasive particles in response to the magnetic field gradient. Thereafter the ribbon, which is pressed against the wall by the magnetic field gradient, is dragged through the gap. Due to MR fluid plasticity, a thin layer of sheared fluid is formed, sandwiched between the lens surface and a core of un-sheared material attached to the moving wall. At sufficiently high shear rates, such flow is characterized by intense interaction and collision between the abrasive particles and with the lens surface, causing a polishing by ablation of the lens surface. This area is known in the MRF arts as the "polishing spot."

U.S. Pat. No. 5,804,095 discloses that MR polishing fluid may comprise both non-colloidal magnetic particles and abrasive particles. Abrasive particle size may be in the range of 1 to 7 microns and magnetic particles medium diameter range of ~3 to 5 microns. Obtained values of roughness can be in the range of 0.7 to 1 nm rms.

The polishing process employs a computer program to determine a CNC machine schedule for varying the velocity (dwell time) and the position of the rotating workpiece through the polishing spot. Because of its conformability and subaperture nature, this polishing tool may finish complex surface shapes like aspheres having constantly changing local curvature. A fundamental advantage of MRF over competing technologies is that the polishing tool does not wear, since the recirculating fluid is continuously monitored and rejuvenated. Polishing debris and heat are continuously removed.

The technique requires no dedicated tooling or special setup. Owing to its unique features, MRF is considered as a deterministic process that can reliably deliver predictable, high precision surfaces in a programmable automatic regime.

In the case of a binary (bimodal) mixture, as is the case for MR fluid, and according to the principle of conservation of momentum, larger particles may supply considerable load for smaller particles. When such an event takes place near the substrate surface, it may result in effective surface indentation by the smaller particle, especially if the particle possesses appropriate mechanical properties. As applied to MR polishing, this conceptual model suggests that larger or basic particles, such as the ferromagnetic particles, energized by shear flow provide an indentation load for smaller abrasive particles to penetrate the surface and remove material, i.e., the high-momentum larger magnetic particles accelerate and drive the smaller abrasive particles against or actually into the surface of the substrate. Such a mechanism of material removal is accepted for MR fluid-based polishing processes, assuming that some form of shear flow of a highly concentrated suspension (45-50 vol. %) of relatively large magnetic particles and much smaller abrasive particles occurs in the polishing interface, resulting in material removal over the lens contact zone.

This mechanism is disclosed and qualitatively confirmed by W. Kordonski and S. Gorodkin in "Material Removal in Magnetorheological Finishing of optics", 2011, Applied Optics, vol. 50, No. 14, pp 1984-1994, which is herein incorporated by reference. Preferably, the magnetic particles are two to three orders of magnitude larger than the abrasive particles. For abrasive particle sizes down to about 100 nm, Kordonski and Gorodkin show that the rate of material removal is well predicted by classical mechanics and can be controlled by controlling the magnetic field, the geometrical parameters of the interface, and the wall velocity.

As noted above, prior art MRF finishing can provide surface roughness of glass as low as about 0.40 nm rms. It is an object of the present invention to provide MRF conditions (MR fluid and method) enabling the surface polishing of a glass substrate to a surface roughness of less than about 0.15 nm rms, and preferably below about 0.10 nm rms.

SUMMARY OF THE INVENTION

Briefly described, a magnetorheological fluid for use in magnetorheological finishing of a substrate surface comprises an aqueous carrier vehicle; a first amount of magnetic particles having a average diameter between about 1 micrometer and about 2 micrometers; and a second amount of abrasive particles having an average diameter between about <1 nanometer and about 10 nanometers. The fluid may further comprise a chemical stabilizer. Preferably, the magnetic particles are spherical and include carbonyl iron, and preferably the abrasive particles are selected from the group consisting of aluminum oxide, cerium oxide, zirconium oxide, silica, boron carbide, silicon carbide, natural diamond, synthetic diamond, and combinations thereof.

Employing an MR fluid in accordance with the present invention in an otherwise conventional MR finishing system can result in substrate surfaces having measured rms roughness less than 0.10 nm and surprising and unpredicted high surface removal rates of 0.5-0.6 microns/minute.

DESCRIPTION OF THE PREFERRED EMBODIMENTS

As described above, the mechanism of particle loading in MRF suggests that material removal in this case is not limited by abrasive particle size, thus making possible a reduction in surface roughness by choosing abrasive particles as small as practically possible. However, it is obvious that there must be a practical lower limit to abrasive particle size. The incorporated Kordonski and Gorodkin reference deals with the finishing process in terms purely of classical mechanics, i.e., momentum conservation in elastic collisions between particles. By this mechanism, a smaller particle is accelerated by collision with a moving larger particle, and the greater the disparity in size the greater the degree of acceleration. The investigated and reported range of abrasive particle size has a lower limit of 100 nm, which was able to produce a removal rate of about 1.5 microns/minute, as predicted by classical mechanical theory.

It was hoped, although never previously tested, that MRF using abrasive particles in the nano size range of 15 nm or less might achieve glass surface finish in the ultrasmooth range of <0.10 rms. However, it was fully expected that if such ultrasmooth finishing did occur, the rate of removal would be extremely low, most probably about 0.05 microns/minute.

Extrapolating the known classical mechanical mechanism into the nanometer particle range was highly uncertain of results, or even feasibility, because of several possibly prohibitive (or enhancing) factors, and perhaps others that could not be anticipated.

First, as described above, nanoparticles behave in a quantum physics fashion rather than according to classical macromechanics. The surface area, and thus the surface-to-volume ratio, is enormous, creating large numbers of atomically-active sites on each particle. It was thought that perhaps this phenomenon might actually augment surface polishing smoothness and removal rate by increasing surface bonding of each particle to an area of the substrate surface that is subsequently plucked away. (Such, it is believed, has turned out to be the case.)

Second, because the diameters of nanoparticles (about 1.0 nm to about 15 nm) are only about an order of magnitude larger than the effective diameter of a water molecule (0.15 nm), nanoparticles might have entirely different and unpredictable mobility in aqueous fluid when compared to macroparticles of the same material. Hydration structures of the particles and pseudo-viscosity effects might dominate.

Third, the surface roughness of the magnetic particles might become a factor if abrasive nanoparticles could simply be absorbed into depressions in the surfaces of the momentum-imparting magnetic particles rather than rebounding therefrom at high velocity. For the first time, surface roughness of the magnetic particles became a factor to consider.

Thus, because the predicted substrate surface removal rate was only about 0.05 microns/minute, it was completely unexpected and surprising to find upon the present experimentation that the actual removal rate was at least an order of magnitude greater, and that substrate surface smoothness was as good as or better than expected. A proposed explanation for the measured high rate of removal is presented below.

Thus, the present invention achieves the hoped-for objective of substantially reducing surface roughness at surprising and unexpected rates of removal, as explained below.

Referring now to the MR fluid of the present invention, in MR finishing, magnetic particles are responsible for load or removal rate, and abrasive particles define particularities of substrate surface indentation or roughness and, to some extent, removal rate as well. Thus, an MR fluid in accordance with the present invention comprises two populations of particles, each having its own size range distribution as described below.

The following considerations are important in formulating an MR fluid for ultrasmooth finishing. The size of magnetic particles must provide a unit load in the material to be polished sufficient for substrate material tensile failure in the manner of ductile failure or in the manner of brittle failure, depending upon the material to be polished. At the same time, the magnetic particles must be reasonably large to provide a sufficient yield stress in the MR fluid induced by a magnetic field. It has been found that the currently preferred size of magnetic particles should be in the range of about 1 to about 2 microns to provide a sufficient removal rate on glasses. Any ferromagnetic particles can be used, preferably spherical particles of carbonyl iron. Surface roughness of carbonyl iron particles does not appear to be a factor.

It has also been found that the abrasive particles should be as small as possible, and preferably between 2 and 3 orders of magnitude smaller than the magnetic particles. Nanoparticles are defined herein as the smallest units that can still behave as a whole entity in terms of properties and transport, preferably ultrafine particles in the size range <15 nm, and preferably about <1.0 nm to about 10 nm. Abrasive particles of aluminum oxide, zirconium oxide, cerium oxide, silica, boron carbide, silicon carbide, synthetic diamond, etc. can be suitable.

In a presently preferred formulation, a water-based MR fluid comprises carbonyl iron magnetic particles with an average size of 1.2 micrometers; cerium oxide particles with an average size of 2 nanometers; and chemical stabilizers.

Surface quality of a polished surface may be characterized by measurement and calculation of the following parameters:

$R_q$=root mean square (rms) of the departure of values from a mean surface;

$R_a$=the arithmetic average of the absolute values of surface roughness measurements; and $R_{max}$=the maximum height among the measured values from a mean surface.

Example 1

A first glass substrate surface was magnetorheologically finished using C-10+MR fluid, a prior art MR polishing fluid available from QED Technologies, Rochester, N.Y., USA, comprising magnetic particles about 3.5 micrometers in size, and cerium oxide particles about 40-50 nanometers in size, resulting in a magnetic/abrasive particle size ratio of 78. Measured surface quality parameters were $R_q$=0.386 nm, $R_a$=0.306 nm, and $R_{max}$=3.207 nm. Removal rate was about 1.5 microns/minute.

Example 2

A second glass substrate surface was magnetorheologically finished using a currently preferred MR fluid in accordance with the present invention, comprising magnetic particles about 1.2 micrometers in size and cerium oxide particles about 2.5 nm in size, resulting in a size ratio of 480. Measured surface quality parameters were $R_q$=0.084 nm, $R_3$=0.066 nm, and $R_{max}$=1.40 nm. Removal rate was 0.5-0.6 microns/minute.

MRF process conditions were identical for both exemplary surfaces.

Note that the measured removal rate (0.5-0.6 microns/minute) is about ten times greater than the predicted rate (0.05 microns/minute). Although the following theory should not be relied upon as proven, the inventor believes that the measured high removal rate is the result of two mechanisms working together. First, the classical momentum physics theory as disclosed above and also by Kordonski and Gorodkin provides a relatively low but measureable removal rate. Second, to that is added the chemical theory also disclosed above wherein the very fine abrasive nanoparticles, because of very large surface area and therefore a large number of active atomic sites, become chemically attached to the substrate surface and assist in plucking material from that surface, thereby increasing the overall measurable removal rate.

It is seen that when a surface is finished by prior art MRF technology using an MR fluid in accordance with the present invention, wherein the size range of the abrasive particles is between about <1 nanometer and about 15 nanometers and the size range of the magnetic particles is between 2 and 3 orders of magnitude greater, a substantial and measureable improvement in surface ultrasmoothness over the prior art can be provided, at an acceptably high removal rate. In the present examples, when compared to prior art results, the root mean square value and the arithmetic average value are each reduced by about 75%, the maximum height of surface roughness is reduced by about 50%, and the removal rate is reduced about 65%.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A magnetorheological fluid for use in magnetorheological ultrasmooth polishing of a substrate surface, comprising:
    an aqueous carrier vehicle;
    a first amount of magnetic particles having a first average diameter; and
    a second amount of abrasive particles having a second average diameter,
    wherein said first average diameter is between about 2 and about 3 orders of magnitude larger than said second average diameter, and
    wherein the material of said abrasive particles is selected from the group consisting of aluminum oxide, zirconium oxide, cerium oxide, silica, boron carbide, silicon carbide, and combinations thereof.

2. A magnetorheological fluid in accordance with claim 1 wherein said first average diameter is between about 1 micrometer and about 2 micrometers, and said second average diameter is between about <1 nanometer and about 15 nanometers.

3. A magnetorheological fluid in accordance with claim 1 further comprising a chemical stabilizer.

4. A magnetorheological fluid in accordance with claim 1 wherein said magnetic particles include carbonyl iron.

5. A magnetorheological fluid in accordance with claim 4 wherein said magnetic particles are spherical.

6. A magnetorheological fluid in accordance with claim 2 comprising only one type of magnetic particle and only one type of abrasive particle.

* * * * *